United States Patent
Ranta-Aho et al.

(10) Patent No.: US 9,391,912 B2
(45) Date of Patent: Jul. 12, 2016

(54) SELECTIVE BICASTING

(71) Applicant: Nokia Solutions and Networks Oy, Espoo (FI)

(72) Inventors: Karri Markus Ranta-Aho, Espoo (FI); Jani Matti Johannes Moilanen, Helsinki (FI); Hans Thomas Hoehne, Helsinki (FI); Antti Anton Toskala, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/399,200

(22) PCT Filed: Apr. 18, 2013

(86) PCT No.: PCT/EP2013/058095
§ 371 (c)(1),
(2) Date: Nov. 6, 2014

(87) PCT Pub. No.: WO2013/167360
PCT Pub. Date: Nov. 14, 2013

(65) Prior Publication Data
US 2015/0117313 A1    Apr. 30, 2015

(30) Foreign Application Priority Data

May 11, 2012    (WO) ................. PCT/EP2012/058843

(51) Int. Cl.
*H04L 12/823*    (2013.01)
*H04W 36/18*    (2009.01)
*H04L 12/761*    (2013.01)
*H04B 7/02*    (2006.01)

(52) U.S. Cl.
CPC ................ *H04L 47/32* (2013.01); *H04B 7/022* (2013.01); *H04L 45/16* (2013.01); *H04W 36/18* (2013.01)

(58) Field of Classification Search
None
See application file for complete search history.

(56) References Cited

U.S. PATENT DOCUMENTS

| | | | |
|---|---|---|---|
| 8,443,097 B2* | 5/2013 | Parekh | H04N 21/23406 709/231 |
| 2002/0110097 A1* | 8/2002 | Sugirtharaj | H04W 28/20 370/329 |
| 2003/0118031 A1* | 6/2003 | Classon | H04L 1/1671 370/395.54 |
| 2004/0076158 A1* | 4/2004 | Okubo | H04L 45/00 370/390 |
| 2007/0189262 A1* | 8/2007 | Kim | H04W 72/1221 370/347 |
| 2008/0186918 A1* | 8/2008 | Tinnakornsrisuphap | H04L 47/10 370/331 |
| 2009/0109972 A1* | 4/2009 | Chen | H04L 12/1877 370/390 |

(Continued)

FOREIGN PATENT DOCUMENTS

EP    1 551 113 A1    7/2005

OTHER PUBLICATIONS

Ericsson "Handling multiple transmission of RLC PDUs"; R3-120732; 3GPP TSG RAN WG3 Meeting #75bis, San Jose del Cabo, Mexico, Mar. 26-30, 2012; pp. 1-2; 3rd Generation Partnership Project (3GPP); Mobile Competence Centre; 650, Route des Lucioles; F-06921 Sophia-Antipolis Cedex; France, (2 pages).

(Continued)

*Primary Examiner* — Hong Cho
(74) *Attorney, Agent, or Firm* — Harrington & Smith

(57) ABSTRACT

A method including receiving a packet and determining whether a bicast indication associated with the packet indicates that the packet has been transmitted to two or more access points; and dropping the packet in dependence on at least one criterion.

19 Claims, 11 Drawing Sheets

(56) References Cited

U.S. PATENT DOCUMENTS

2010/0150048 A1* 6/2010 Tsai .................. H04L 12/189
 370/312
2010/0195558 A1* 8/2010 Koskinen ............ H04L 41/5019
 370/312

OTHER PUBLICATIONS

3GPP TSG-RAN WG2 Meeting #77bis, Jeju, South Korea, Mar. 26-30, 2012, R2-121155, "SRB with Multiflow HSDPA", Nokia Siemens Networks, 5 pgs.

\* cited by examiner

SELECTIVE BICASTING

This application relates to a method and apparatus, and in particular but not exclusively to bicasting.

A communication system can be seen as a facility that enables communications between two or more entities such as a communication device, e.g. mobile stations (MS) or user equipment (UE), and/or other network elements or nodes, e.g. Node B or base transceiver station (BTS), associated with the communication system. A communication system typically operates in accordance with a given standard or specification which sets out what the various entities associated with the communication system are permitted to do and how that should be achieved.

Wireless communication systems include various cellular or otherwise mobile communication systems using radio frequencies for sending voice or data between stations, for example between a communication device and a transceiver network element. Examples of wireless communication systems may comprise public land mobile network (PLMN), such as global system for mobile communication (GSM), the general packet radio service (GPRS) and the universal mobile telecommunications system (UMTS).

A mobile communication network may logically be divided into a radio access network (RAN) and a core network (CN). The core network entities typically include various control entities and gateways for enabling communication via a number of radio access networks and also for interfacing a single communication system with one or more communication systems, such as with other wireless systems, such as a wireless Internet Protocol (IP) network, and/or fixed line communication systems, such as a public switched telephone network (PSTN).

The radio access network may provide a connection between the core network (CN) and a device such as a user equipment (UE) and implements a radio access technology. Examples of radio access networks may comprise the UMTS terrestrial radio access network (UTRAN) and the GSM/EDGE radio access network (GERAN). The radio access network may include entities such as a base station or node B and a radio network controller (RNC).

A geographical area covered by a radio access network is divided into cells defining a radio coverage provided by a transceiver network element, such as a Node B. A single transceiver network element may serve a number of cells. A plurality of transceiver network elements is typically connected to a controller network element, such as a radio network controller (RNC). The logical interface between an RNC and a Node B, as defined by the third generation partnership project (3GPP), is called as an Iub interface.

The radio network controller (RNC) may provide control functionality for the radio access network and provide packets to nodeBs to be transmitted to a user equipment (UE).

There is provided according to a first aspect a method comprising: receiving a packet and determining whether a bicast indication associated with the packet indicates that the packet has been transmitted to two or more access points; and dropping the packet in dependence on at least one criterion.

The method may further comprise transmitting the packet when the at least one criterion is satisfied.

The at least one criterion may correspond to a level of reliability of at least one connection between a respective at least one access point and a user equipment.

The method may further comprise receiving information corresponding to a level of reliability of the at least one connection between the at least one access point and the user equipment.

Determining whether at least one criterion for a packet is satisfied may further comprise determining a level of reliability of the at least one connection based on the received information.

The method may further comprising selecting the at least one criterion from a set of criterion. The at least one criterion may be selected based on the indication.

The bicast indication may correspond to at least one of a priority class of a packet flow; and a connection between an access point and a user equipment.

The indication may indicate at least one of an identity of a packet flow; and a priority associated with the packet.

The at least one criterion may be associated with a time period.

Determining whether the at least one criterion is satisfied may further comprise determining when the at least one criterion is satisfied for a duration of the time period.

Determining whether the at least one criterion is satisfied may further comprise determining when the at least one criterion is satisfied at any point during the time period.

The method may further comprise receiving the bicast indication associated with the packet.

The method may further comprise: comparing the at least one criterion from a first of said two or more access points with a respective at least one criterion from at least a second of said two or more access points; and dropping said packet in dependence on the result of said comparison.

There is provided according to a second aspect a method comprising: transmitting a criterion to a respective two or more access points; and transmitting a packet to the two or more access points; wherein the at least one criterion is configured to indicate to a respective access point that the packet should be dropped when the criterion is not satisfied.

A computer program product may configured to perform the methods.

There is provided according to a third aspect an apparatus comprising: receiving means for receiving a packet; determining means for determining whether a bicast indication associated with the packet indicates that the packet has been transmitted to two or more access points and wherein the apparatus is configured to drop the packet in dependence on at least one criterion.

There is provided according to a fourth aspect an apparatus comprising: transmitting means for transmitting at least one criterion to a respective two or more access points and transmitting a packet to the two or more access points; wherein the at least one criterion is configured to indicate to a respective access point that the packet should be dropped when the criterion is not satisfied.

The apparatus may be a radio network controller.

There is provided according to a fifth aspect an apparatus comprising a processor and at least one memory, wherein the processor is configured to carry out computer readable instructions to carry out the steps of: determining whether a bicast indication associated with a received packet indicates that the packet has been transmitted to two or more access points; dropping the packet in dependence on at least one criterion.

The apparatus may be further configured to transmit the packet when the at least one criterion is satisfied.

The at least one criterion may correspond to a level of reliability of at least one connection between a respective at least one access point and a user equipment.

The apparatus may be further configured to receive information corresponding to a level of reliability of the at least one connection between the at least one access point and the user equipment.

Determining whether at least one criterion for a packet is satisfied may further comprise determining a level of reliability of the at least one connection based on the received information.

The apparatus may be further configured to select the at least one criterion from a set of criterion. The at least one criterion may be selected based on the indication.

The bicast indication may correspond to at least one of a priority class of a packet flow; and a connection between an access point and a user equipment.

The indication may indicate at least one of an identity of a packet flow; and a priority associated with the packet.

The at least one criterion may be associated with a time period.

Determining whether the at least one criterion is satisfied may further comprise determining when the at least one criterion is satisfied for a duration of the time period.

Determining whether the at least one criterion is satisfied may further comprise determining when the at least one criterion is satisfied at any point during the time period.

The apparatus may be further configured to receive the bicast indication associated with the packet. comparing the at least one criterion from a first of said two or more access points with a respective at least one criterion from at least a second of said two or more access points; and dropping said packet in dependence on the result of said comparison FIG. 1 shows an example of a network;

Figure 1:
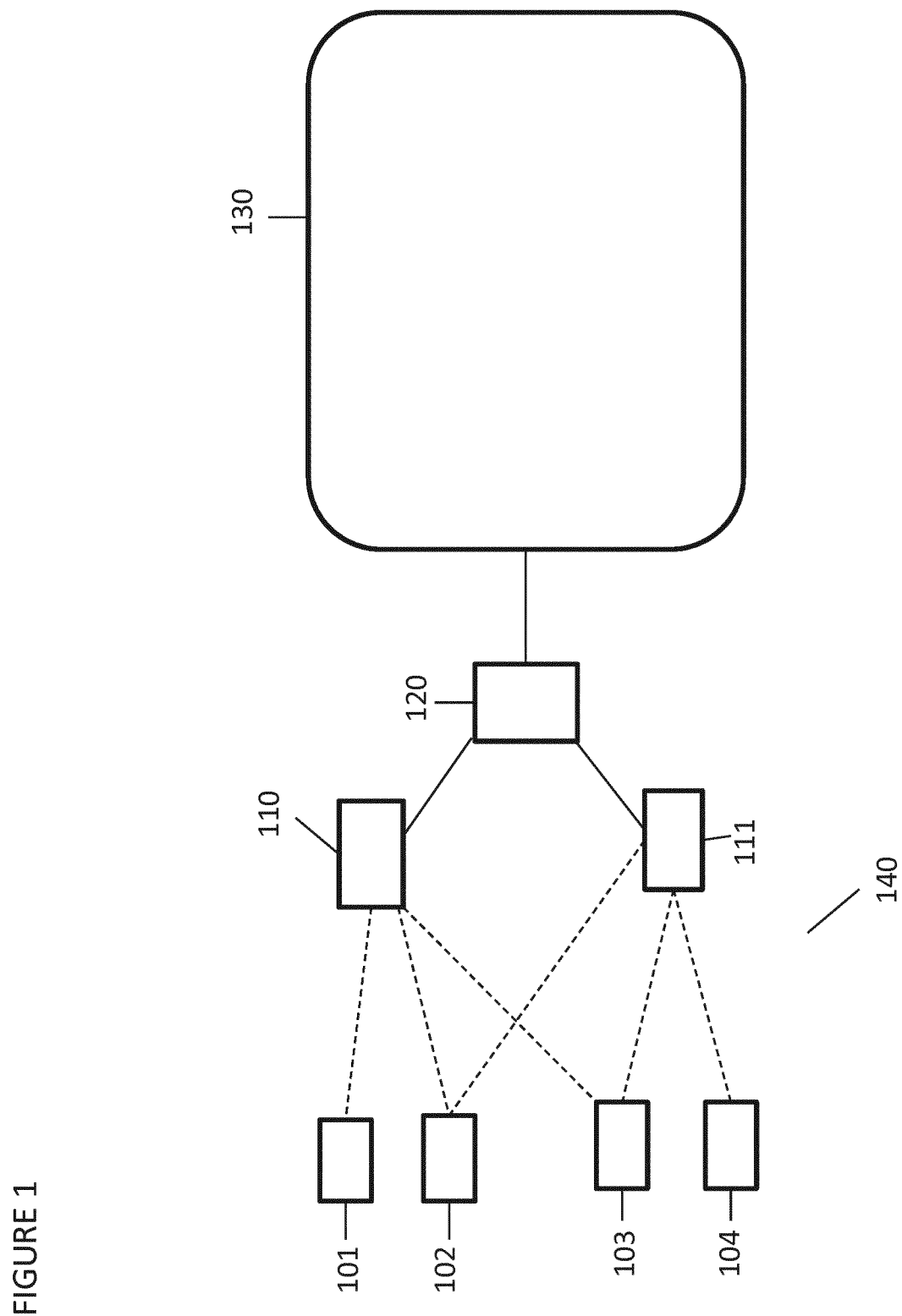

Multiflow is a capability of a user equipment or destination device to actively connect to more than one access point, for example a node B or base station, at a given time. In some embodiments, a radio access network may implement a bicast multiflow where a packet in an information flow may be sent via different routes by separate entities. Alternatively, a unicast multiflow may be implemented in which for a single packet only a single route (out of choice of e.g. two routes) is provided.

For example, in bicasting, a packet may be provided to two access points such as a node B or base transceiver station and each access point may transmit the packet to a user equipment. In unicast, the packet may be provided to and transmitted by only one access point. The user equipment (UE) may operate using unicast multiflow where packets of packet flows are received from one access point only or by bicast multiflow where packets of a packet flow may be received from more than one access point.

The use of bicasting may be for example of interest when a user equipment (UE) or destination device is at a cell edge, for example on the border between a cell and its neighbouring cell. The user equipment may for example experience poorer channel quality due to the relative far distance from the access points. Bicasting may also be of use in situations where a reliability of the transmission is important.

For example, in a unicast operation, a packet may be transmitted from a single access point to a user equipment. In a bicasting, the very same packet may be transmitted from both a first and second access point to the user equipment. A bicast multiflow may be more reliable than that a unicast multiflow because a packet is transmitted along two different routes in order to reach the destination device. Therefore, if the first route experiences low quality, the packet may still arrive at its destination along the second route.

However, bicasting may be less efficient than unicasting as more resources are required to transmit a packet.

A radio network controller (RNC) may select between the transmission of a packet or packet flow via unicast or bicast. For example, the radio network controller (RNC) may receive a packet flow from a further network entity or external entity via the core network, and decide whether a packet or packet flow is to be transmitted using bicasting or unicasting.

If the radio network controller (RNC) determines that bicasting is to be used, the RNC may duplicate a packet and provide it to multiple access points for transmission to the destination device. If unicasting is chosen, the RNC may transmit the packet to a single access point for further transmission to the destination device.

The RNC may decide whether to bi- or unicast a packet based on characteristics of the network. For example, the RNC may make a decision based on channel quality between an access point and destination device.

In some cases, however, the RNC may not have sufficient access to information regarding the channel quality or other network characteristics and this information may have to be approximated.

In some embodiments of the present application, a decision may be made at an access point whether a packet is to be sent by bicasting or unicasting. In some embodiments, an access point may decide whether to transmit a packet or drop the packet based on a criterion for dropping packets and information about the reliability of a connection from the access point to the destination device.

FIG. 1 shows an example of a network in which some embodiments may be implemented.

FIG. 1 comprises an example of the radio access network 140 and an associated core network 130. FIG. 1 shows four user equipment 101, 102, 103 and 104. While four user equipment are shown in the example of FIG. 1, it will be appreciated that the radio access network 140 can comprise a differing amount.

The radio access network 140 comprises a first access point 110 and a second access point 111. The first access point 110 may communicate with a first user equipment 101 and a second user equipment 102. The first access point 110 may additionally be in communication with a third user equipment 103 which may also be in communication with the second access point 111. The second access point 111 may be in communication with a third user equipment 103 and a fourth user equipment 104. The second access point 111 may additionally be in communication with the second user equipment 102.

It can be seen from FIG. 1 that the second user equipment 102 and the third user equipment 103 may be in communication with both access points 110 and 111.

Each of the access points 110 and 111 may communicate with a radio network controller 120. The radio network controller 120 may further be able to communicate with a core network 130. The core network 130 may be capable of providing packet switched and circuit switched services and access to external networks for example the Internet. For example, the radio network controller 120 may communicate with a media gateway during circuit switched communication and a serving GPRS support node during packet switched communication. It will be appreciated that this is by way of example only and the core network 130 may include any relevant apparatus and functionality.

The radio network controller 120 may provide control functionality of the radio access network. For example, the radio network controller 120 may provide resource management and/or some mobility management for the first and second access points 110 and 111.

The access points 110 and 111 may act as an intermediate for communication between the user equipment and radio network controller 130. The access points may provide signal coverage and access to the user equipment in the radio access network.

It will be appreciated that this is by way of example only and in embodiments, the functionality carried out by the radio network controller and access points may not be divided in such a way. For example the access points 110 and 111 may carry out some of the functionality of the radio network controller. While the following description refers to a radio network controller, it will be appreciated that at least some of the functionality of the radio network controller may be incorporated in an access point. As an alternative, an entity configured to provide packets to be transmitted to relevant access points may be provided.

In some embodiments, the access point may be a base station entity such as a base transceiver station (BTS), NodeB and/or eNodeB for example.

It will also be appreciated that while only user equipment 102 and 103 are shown in multiflow communication with the first and second access points 110 and 111, more or less user equipment may communicate with both access points. Additionally the user equipment may be able to communicate with more than two access points at a time in some embodiments.

Figure 2:
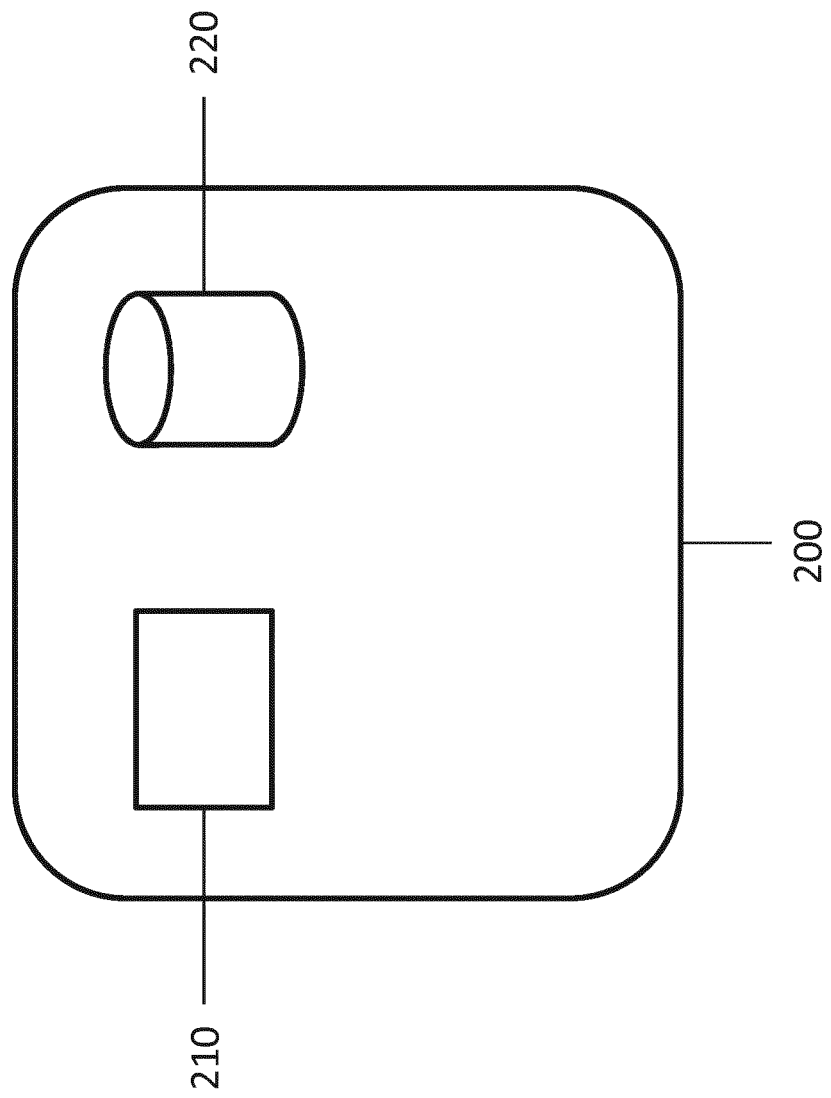
FIG. 2 shows an example of a network entity.

FIG. 2 shows an example of an entity in accordance with some embodiments.

The entity 200 FIG. 2 may comprise processor 210 and a memory 220. It will be appreciated that the features of FIG. 2 may be provided as a user equipment, access point and/or radio network controller or other network node. The memory 210 may comprise or contain instructions which may be carried out by the processor 210 in order to provide the functionality of some embodiments. It will be appreciated that the apparatus of the entity 200 may further comprises means for receiving and transmitting data, means for decoding and/or encoding data and other such means that may be implemented in such an entity.

Figure 3:
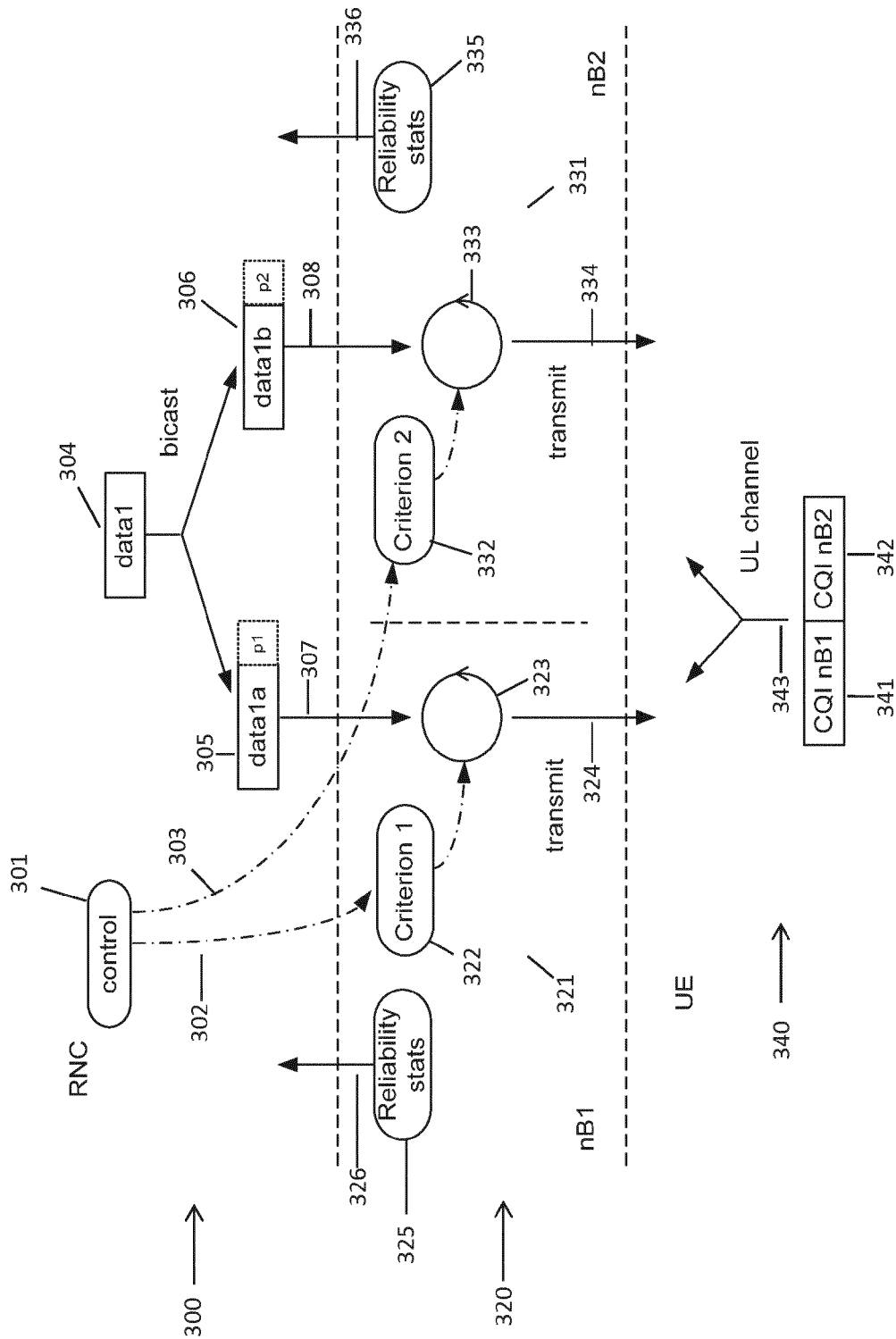
FIG. 3 shows network functionality according to an embodiment.

FIG. 3 shows an example of a radio access network functionality in accordance with an embodiment.

FIG. 3 show a radio network controller (RNC) layer 300, an access point layer 320 and a user equipment (UE) layer 340. The RNC layer 300 shows an example of the functionality of a RNC, the access point layer shows an example of the functionality of one or more access points and the UE layer 340 shows an example of the functionality of a UE or destination device.

The RNC layer 300 has a control function 301. The control function 301 may determine a criterion to be sent to one or more access points concerning the management of bicasting. The RNC layer 300 may receive a dataflow 304 comprising data packets. When the RNC layer 300 is operating in accordance with bicasting, the RNC layer 300 may split the data flow into two or more duplicate data flows 307 and 308. It will be appreciated that the RNC layer 300 may split the data flow on a packet by packet basis.

The access point layer 320 may comprise a first access point 321 and a second access point 331. The first access point 321 may receive a criterion 322 from the control function 301 of the RNC layer 300. Similarly, the second access point 331 may receive a criterion 332 from control function 301 of the RNC layer 300. The RNC may transmit the criterion for the first access point 322 via connection 302 and transmit the criterion of the second access point 332 via a connection 303. It will be appreciated that the connections 302 and 303 may be via an interface between the RNC and the access points.

A first duplicate data flow 305 may be transmitted from the RNC layer 300 to the first access point 321 via a connection 307. Similarly, the second duplicate dataflow 306 may be transmitted via connection 308 to the second access point 331.

At arrival at the first access point 321 of the first duplicate data flow 305 or data packet, it is determined by a determination function 323 whether to drop the packet or transmit the packet further to the destination device 340. The determination function 323 may take into account the criterion 322 received from the RNC layer 300.

Similarly, at arrival of the second duplicate data flow 306 or data packet, a determination 333 is made whether to drop the packet or to transmit it. This determination 333 may take into account the criterion received from the RNC layer 300.

In some embodiments, the determination functions 323 and 333 may take into account information received from a user equipment or destination device 340.

If the first access point 321 determines that the packet is to be transmitted, the first access point 321 transmits the packet via connection 324. Similarly, if the second access point 331 determines at 333 that the packet is to be transmitted, the second access point 331 transmits packet via connection 334.

The UE layer or destination device 340 may receive packets via connections 324 and 334 from the first and second access points 321 and 331. It will appreciated that these received packets may be acknowledged and decoded to provide the packet data to a user.

In some embodiments, the UE layer 340 may make a determination of a reliability of a communication between an access point and the UE. For example the UE layer 340 may measure a quality of a channel on which the data packets are received. The UE layer 340 may further report this information to an access point and/or RNC.

The first and second access points 321 and 331 may include means for calculating information regarding the reliability of a connection between an access point and the destination device. For example, the first access point 321 may comprise a first reliability module 325 and the second access point 331 may comprise a second reliability module 335.

The reliability modules 325 and 335 may receive reliability data from the user equipment layer 340. The reliability modules 325 and 335 may also receive information from the determining means 323 and 333 as to whether a packet was transmitted or dropped. In some embodiments, the reliability modules may use the received reliability data from the UE layer 340 and information regarding which packets were transmitted/dropped from the determining means 322 and 333 to generate reliability information. In some embodiments, the reliability modules may receive information that a packet has been dropped and use this information to generate statistics regarding the dropping of packets.

This reliability information may be sent to the RNC layer 300. In some embodiments the RNC layer 300 may use the received reliability information to determine and/or update the criterion 322 and 332 sent to the first and second access points 321 and 331.

Figure 4:
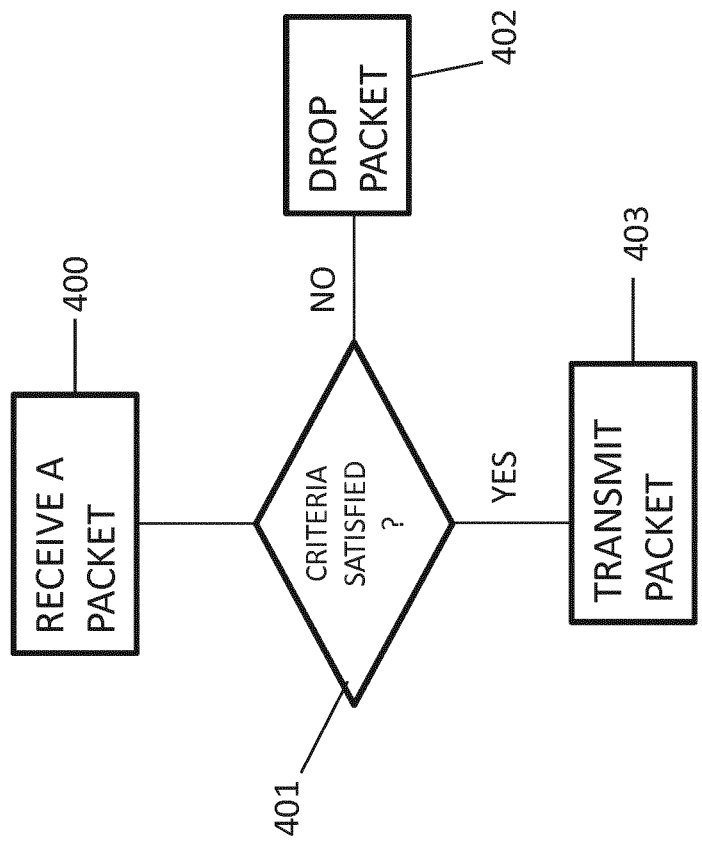
FIG. 4 shows method steps carried out by an access point according to an embodiment.

FIG. 4 shows an example of the method steps that may be carried out by an access point according to some embodiments.

At step 400, an access point receives a packet from a radio network controller. It will be appreciated that the packet may form part of a packet flow. The access point may process the packet to determine a destination of the packet and/or reformat the packet.

At step 401, a determination is made as to whether a criterion for the packet is satisfied.

In some embodiments, the criterion may be received from a radio network controller. It will be appreciated that the criterion may be transmitted with each new packet flow, or updated periodically. Alternatively or additionally, the criterion may be transmitted at set times or as part of a control configuration of the access point by the RNC.

In some embodiments, the access point may include more than one criterion and may select a criterion to use based on the packet or packet flow to be transmitted. For example, a packet or packet flow may be associated with a priority and the access point may select a criterion to apply based on the priority of the packet or packet flow.

If the criterion is satisfied, the method proceeds to step 403 where the access point transmits the packet to a destination device. If the criterion is not satisfied, the method proceeds to step 402 where the packet is discarded.

In some embodiments, the access point may use information provided from the destination device relating to the reliability of a connection(s) between the destination device and one or more access points, to determine whether the criterion is satisfied.

In some embodiments, this information received from the destination device may be in the form of channel quality indications (CQIs). In further or other embodiments, the information may relate to successful receipts of packets at the destination device.

For example, referring to the embodiments of FIG. 3, the UE layer 340 may generate channel quality indications CQI 341 and 342 for the first and second access points 321 and 331 and transmit these on an uplink channel to the first and second access points 321 and 331. The UE layer 340 of the destination device may provide a CQI indication to the access point for which that measurement was made or may provide CQI indications of all the access points to each access point. An access point may receive a CQI indication related to its own communications as well as the CQI indications of one or more surrounding access points.

Alternatively or additionally, in some embodiments, reliability of the connection may be determined by tracking a successful delivery of packets. For examples, some systems may use an acknowledgement of receipt of a packet from a user equipment to an access point. The reliability module of an access point may track successfully and unsuccessfully received packets and determine a reliability of a connection based thereon. For example, some systems may make use of a hybrid automatic repeat request protocol. The reliability module may track acknowledgements received for transmit packets.

It will be appreciated however that in embodiments, the user equipment may make any relevant determination and/or measurement of the reliability of a connection between the user equipment and the access point and provide this information to the access point.

Figure 5:
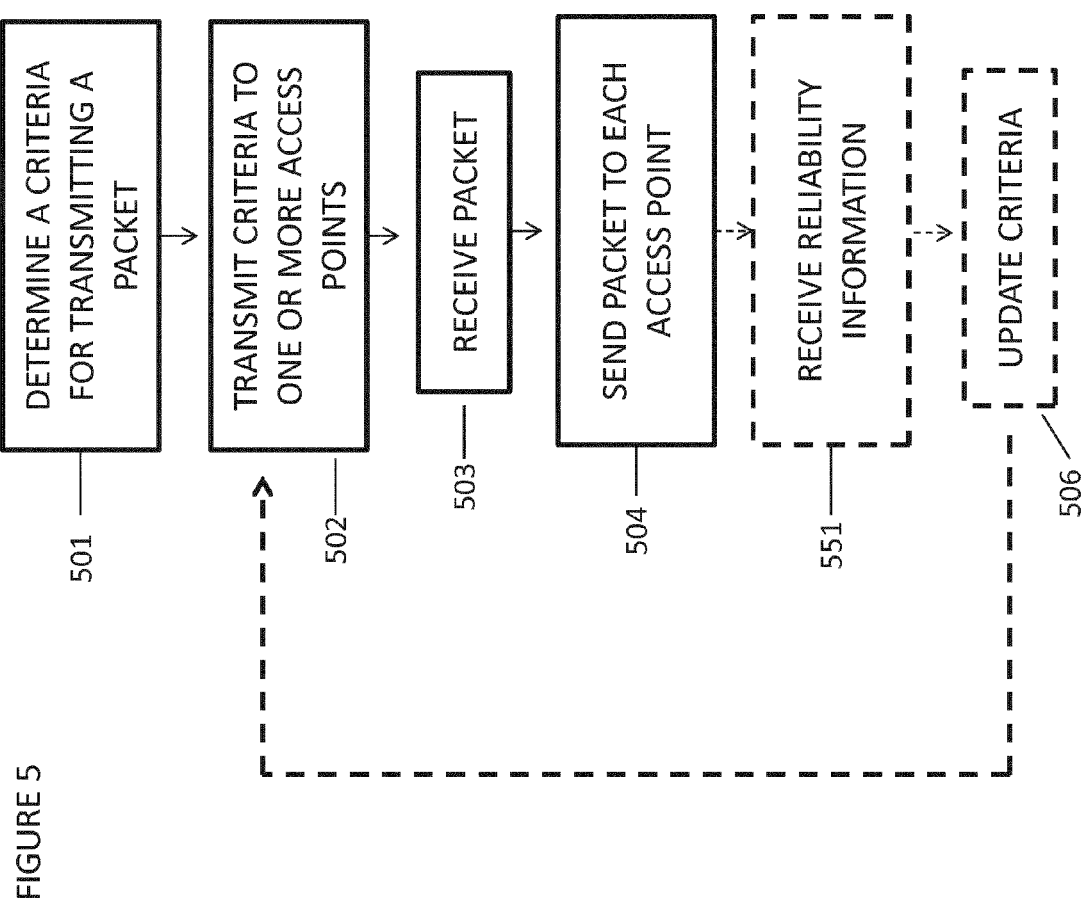
FIG. 5 shows method steps carried out by a radio network controller in accordance with an embodiment.

FIG. 5 shows an example of the method steps carried out by a network node in accordance with some embodiments. In some embodiments, the network node may be an RNC.

At step 501, the network node determines a criterion on which decisions concerning the transmission of a packet may be based. For example, a criterion may be determined for each access point with which the network node is connected, or a single criterion may be determined for one or more of the access points. Additionally or alternatively, a criterion may be determined for only one access point of a set of access points receiving a packet from the node. In this case, one access point may always transmit packets while one or more of the other access points determine whether or not to transmit a packet based on a criterion.

In some embodiments, the access points may have access to a set of criterions and the node may provide an indication of which criterion of the set of criterions the access point is to base a decision on. Alternatively, the node may provide an indication to the access point of a basis on which to select a criterion, for example, the node may send an indication of a mapping between a priority or priority class of a packet or packet flow and the set of criterions.

In some embodiments, a criterion may be defined in a static manner. For example, the criterion may be defined as a formula. In some embodiments, the criterion may be based on a priority class of a packet. For example, in some embodiments, the access point may have a static mapping between a priority class and criterion for examples a threshold CQI value for the priority class.

In one example the formula may be based on channel quality indication (CQI) measurements, for example:

$$\text{CQI of own link} < \text{CQI of other link(s)} - a \text{ threshold}$$

An access point may receive CQI measurements relating to connections between the destination device and other access points. In this case, it is determined to drop a packet if the CQI associated with the access point is outside a range, defined by a threshold value, of the CQI associated with a neighbouring access point. In other embodiments, an access point may receive CQI indications associated with that access point only.

In some embodiments, the CQI values may be filtered to provide an average or weighted CQI for a channel. In other or further embodiments, the criterion may include a time period associated with the threshold.

In some embodiments, the criterion may set a threshold value corresponding to a minimum level of reliability for a connection required in order for a packet to be transmitted. For example, the criterion may set a threshold for a minimum CQI value to be associated with an access point before the access point can transmit a packet. In this example, the access point may determine if the CQI associated with the access point at the time of scheduling satisfies a minimum required CQI set by the criterion.

Alternatively or additionally, a criterion may set a minimum value of reliability as measured by a successful delivery of packets. For example, the criterion may relate to a number of acknowledgments received from the destination device.

In some embodiments, different priorities may be set for different data flows and/or data packets. In this case, different criterions may be applied to packets of different priorities. It will be appreciated that an access point may apply different criterions under different conditions and/or for different packets or packet flows.

In some embodiments, a criterion may be based on a reliability of the connection between the access point and the destination device in relation to the reliability of a connection between a neighbouring access point and the destination device. It will be appreciated that in some embodiments more than two access points may be in communication with the destination device and the criterion may be based in relation to the reliability of the connections of one or more of these neighbouring access points. An access point in some embodiments may therefore have access to reliability information (for example CQI or acknowledgement information) of neighbouring access points.

For example, in one embodiment a criterion may be that a quality of a connection between the access point and the destination device should be better than the quality of a connection of a neighbouring access device. In some embodiments a hysteresis value may be added. Other embodiments may include a comparison with more than one neighbouring access point.

At step 502, a criterion and/or set of criterions are transmitted to the one or more access points. It will be appreciated that each access point may receive their own criterion or set, or one or more access points in the set of access points receiving a packet from the node may receive a different criterion or set. Alternatively all of the access points may receive the same criterion or set.

At step 503, the node may receive a packet of a packet flow. It will be appreciated that the packet flow may be received from another network element, for example a radio network controller, or packet gateway on the core network. It will be appreciated that this is by way of example and the packet flow may be received from a variety of sources within or without a network.

At step 504, the node sends the packet to each access point that may potentially carry out bicasting. It will be appreciated that in some embodiments, the node may determine whether bicasting or unicasting is to take place. In the case of unicasting, the RNC may send the packet to a single access point. In bicasting, the node may, in some embodiments, duplicate the packet and send a copy of the packet to each access point that may potentially take part in bicasting.

In some embodiments, the packet is sent to two access points. In other embodiments, more than two access points may be sent the packet.

In some embodiments, the node selects which access points to send a packet to. In some embodiments all the access points in communication range of a UE will receive the packet. In other embodiments, selected access points will receive the packet.

At step 505, the node may optionally receive reliability information. In some embodiments, the reliability information may be received from each access point that has received a criterion.

At step 506, the node may update a criterion or set of criterions based on the reliability information received at step 505. The method may then return to step 502, where the updated criterion or set are transmitted to one or more access points.

In embodiments, the node may bicast packets to access points. In other words, the node may send a packet to two or more access points. The access point may then implement the bicasting by two or more of the access points determining that the packet is to be transmitted. Alternatively, the access points may effectively implement unicasting by one access point determining that the packet is to be transmitted and the remaining access points determining that the packet is to be dropped.

In some embodiments, one access point may receive a criterion to always transmit the packet while the other access points may selectively transmit a packet. Alternatively the access point may be aware of a measured reliability of the surrounding access points' connections with the destination device, and may decide to transmit or drop a packet accordingly.

In some embodiments, the criterion may be a required value or level of reliability of the connection between the access point and the destination device. The criterion may be used to determine whether it is worthwhile to carry out bicasting instead of unicasting. For example, if a connection between an access point and a user equipment is particularly weak, the benefits of bicasting may not outweigh the strain on the already weak resources of the access point of having to transmit the packet to the user equipment.

In the above case, it may be determined that unicasting is to take place by allowing a second access point to drop a packet and have the packet transmitted only by a first access point. However in a case where for example, an access point has a strong connection with a user equipment, it may be determined that transmitting the packet does not place unnecessary strain on the access point. The reliability advantage in this case may outweigh the loss of efficiency.

FIGS. 6 to 9 show example implementations of some embodiments of the selective transmitting or dropping of packets by an access point. It will be appreciated that while these figures have been described as separate embodiment, they may be implemented individually and/or in combination.

Figure 6:
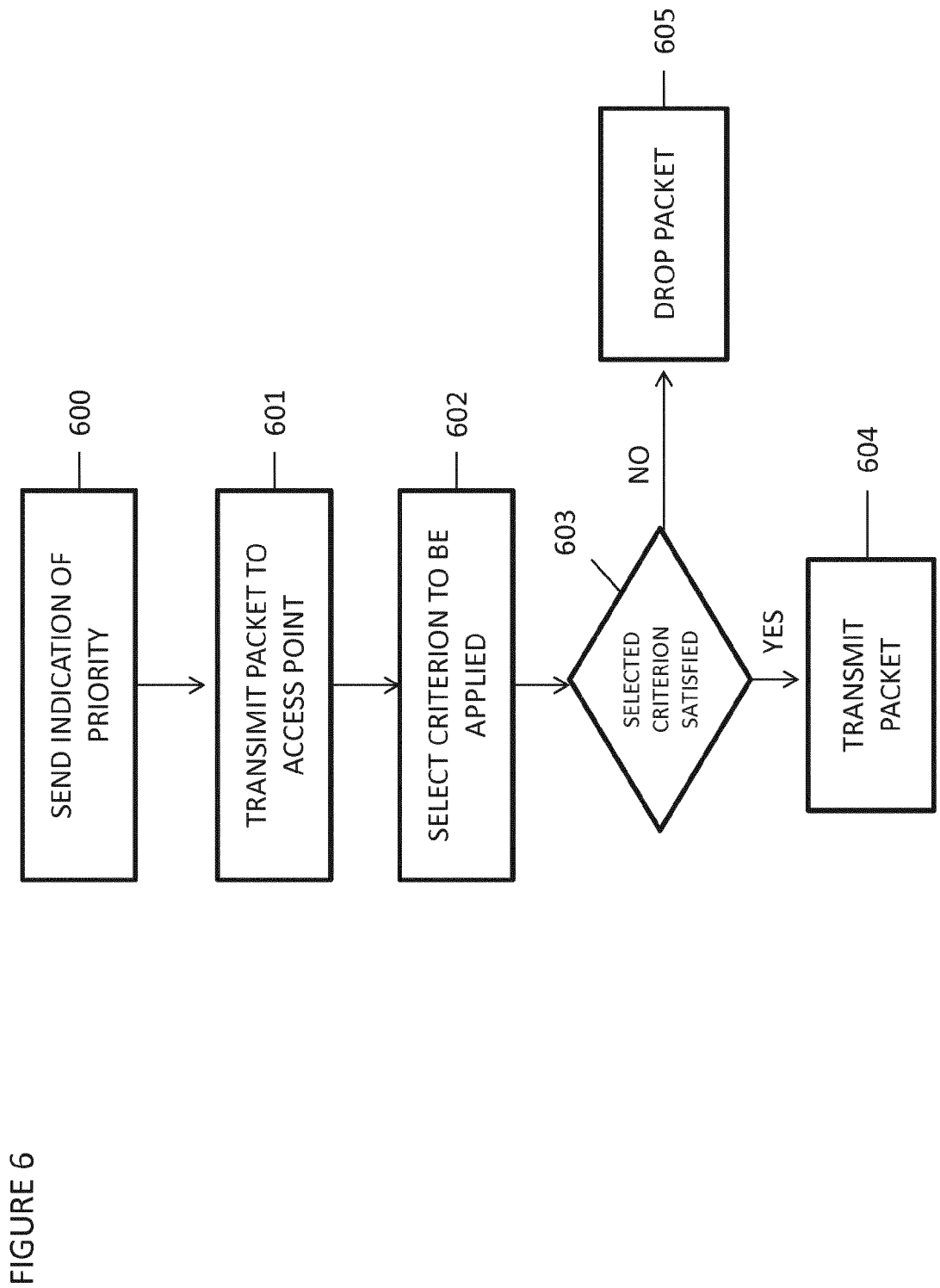
FIG. 6 shows method steps in accordance with a priority based embodiment.

FIG. 6 shows a first example of an implementation having packets associated with an indication of priority level.

In the embodiment of FIG. 6, a priority associated with a packet may indicate a criterion to be applied to that packet when deciding whether to transmit or drop the packet.

At step 600, an indication of a priority associated with a packet is sent. In some embodiments, the indication may be in a form of a tag. In other or further embodiments, the indication may be a packet class of a packet. It will be appreciated that the indication may be an explicit indication or may be an implied indication associated with another characteristic of the packet for example a packet type.

The indication may be associated with the packet by a network node, for example a radio network controller, before the packet is transmitted to one or more access points. The node may associate different indications with each duplicate packet intended for transmission to different access points. Alternatively, the node may associate a same indication with duplicate packets. The node may then transmit the packets to the relevant access points.

At step 601 a packet is transmitted to an access point. It will be appreciated that identical packets may be also transmitted to other access points.

When the access point receives the packet and indication of associated priority, it may determine a criterion to apply when deciding whether to transmit or drop that packet. This can be seen at step 602. For example, the access point may identify the priority of the packet and select a criterion based on that priority. For example, the access point may match the indication of priority to a criterion identifier.

Once a criterion has been selected, the method may progress to step 603, where it is determined whether the selected criterion is satisfied. In some embodiments, the criterion may relate to a measure of reliability of a connection between the access point and a destination device. For example, in some embodiments, the reliability of the connection may be determined and checked against the criterion to see if the level of reliability required by the criterion to transmit the packet has been reached.

If it is determined that the criterion is satisfied, the method progresses to step 604 where the packet is transmitted to the destination device.

If it is determined that the criterion is not satisfied, the method progresses to step 605 where the packet is dropped.

In some embodiments, tags may relate to different priorities assigned to the packets. A criterion to apply may be selected on the basis of the priority of a packet identified by a tag.

For example, a packet with an indicated low priority may be associated with a criterion that allows the packet to be transmitted only when there is a high level of reliability associated with the connection between access point and the destination device. In other words, the criterion may have a relatively high minimum reliability requirement.

If, for example, the packet has an indicated high priority, then the packet may be associated with a criterion that allows the packet to be transmitted even when the connection between the access point and the destination device has a relatively low level of reliability. In other words, a high priority packet may be transmitted even though the level of reliability between the access point and destination device is low.

In some embodiments, an access point with a low level of reliability may have limited resources with which to transmit packets. The transmission of bicast packets may place strain on the limited resources. Therefore in some embodiments, only high priority packets may be bicast by the access point in order to conserve resources for unicast packets from that access point.

In some embodiments, the levels of priority may be such that a first priority indicates that a packet is unicast, for example the packets are transmitted to only access point. In this case, the criterion associated with packets with a first priority may indicate that the packets should always be transmitted.

It will be appreciated that this is by way of example only and the levels of priority and associated criterion can be selected based on the requirement of the system.

In some embodiments, the priority may be a simple indication of whether the packet is bi- or unicast. For example, a first priority may indicate that the packet is unicast and should always be transmitted and second priority may indicate that a packet is bicast and a criterion should be applied to determine whether the packet should be transmitted or dropped.

It will be appreciated that in some embodiments, a different criterion may be applied to different packet priorities and the criterion applied for specific packet priority may change from access point to access point.

In some embodiments the priority level may correspond with a minimum level of reliability required in order to transmit packet. It will be appreciated however, that the tag may be used to select the criterion in any suitable manner.

In some embodiments, the priority of a packet may be signalled to an access point. While the embodiment of FIG. 6 exemplifies the insertion of a tag into a packet to indicate priority, it will be appreciated that the priority may be indicated separately or by other means.

Figure 7:
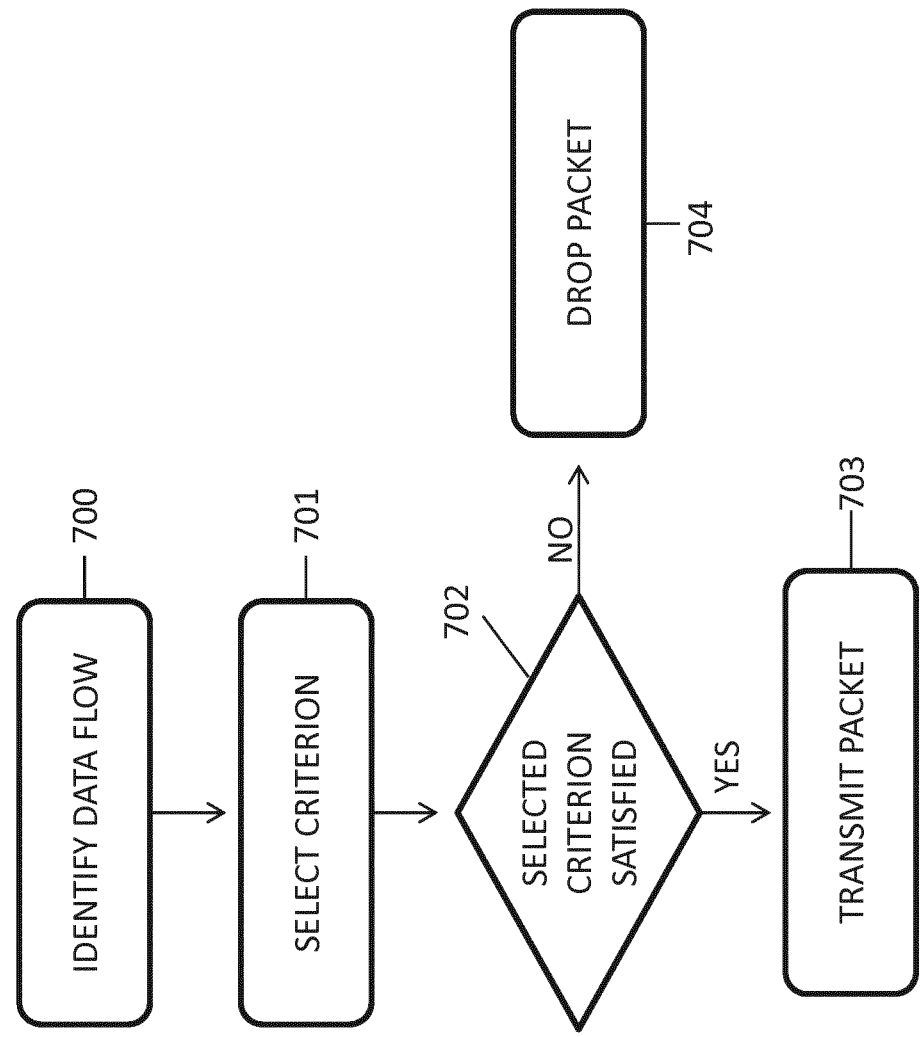
FIG. 7 shows method steps in accordance with a data flow identification embodiment.

FIG. 7 shows another example of an implementation of the system where it determined whether a package is dropped or transmitted based on a type of data flow.

For example, in some embodiments, some types of data flows may be unicast and other types of data flows may be bicast. If a type of data flow is identified as being a type of data flow that is unicast, then a criterion of always transmitting the packet may be applied. If the type of data flow is identified as being a type of dataflow that is bicast, then a criterion based on a level of reliability of the connection between the access point and the destination device may be used to determine whether to drop or transmit the packet.

It will be appreciated that in some embodiments, different types of data flow may be associated with different priorities. For example, a first priority may indicate that a data flow is unicast and a second priority may indicate that the dataflow is bicast.

At step 700, a type of dataflow may be identified. The data flow may be received and identified at the access point. In other embodiments, the data flow may be identified and assigned a priority at the node, for example the radio network controller RNC, and the node may signal a data flow type or priority level of the data flow to the access point.

At step 701, a criterion for determining whether to drop or transmit packets of the data flow may be selected based on the identity or type of the dataflow.

For example, in some embodiments, radio resource control (RRC) signalling and/or voice services may be bicast. This may correspond to identifying certain radio bearers or radio link control (RLC) logical channels as bicast resources. In some embodiments, dataflow types corresponding to best effort packet services may be identified as being unicast. It will be appreciated that this is by way of example only and various other data flow types may be identified and associated with a priority to determine the criterion to be applied.

At step 702, it is determined whether the selected criterion is satisfied. In some embodiments the criterion may relate to a level of reliability of a connection between the access point and a destination device. The level of reliability may be measured and/or otherwise determined and it may be determined whether this level of reliability satisfies the selected criterion.

If it is determined that the criterion is satisfied, the method may progress to step 703 where packets of the dataflow are transmitted.

If it is determined that the criterion is not satisfied, the method may progress to step 704 where packets of the dataflow may be dropped.

It will be appreciated that the determination whether the criterion is satisfied at step 702 may be carried out once for an identified data flow and the subsequent packets transmitted or dropped. In other embodiments, the determination at 702 may be carried out on a packet by packet basis or every time new data concerning the level of reliability is available.

In some embodiments, the criterion may specify a minimum value for the level of reliability for the connection between the access point and the destination device in order to transmit a packet. For example, the criterion may specify a threshold value which the level of reliability should exceed in order for the packet to be transmitted.

For example, measurements such as CQI or other values may be used to determine a level of reliability. CQI measurements may be taken periodically and in some embodiments, the CQI measurements are filtered and/or averaged to determine a level of reliability to compare to the threshold set by the criterion.

Figure 8:
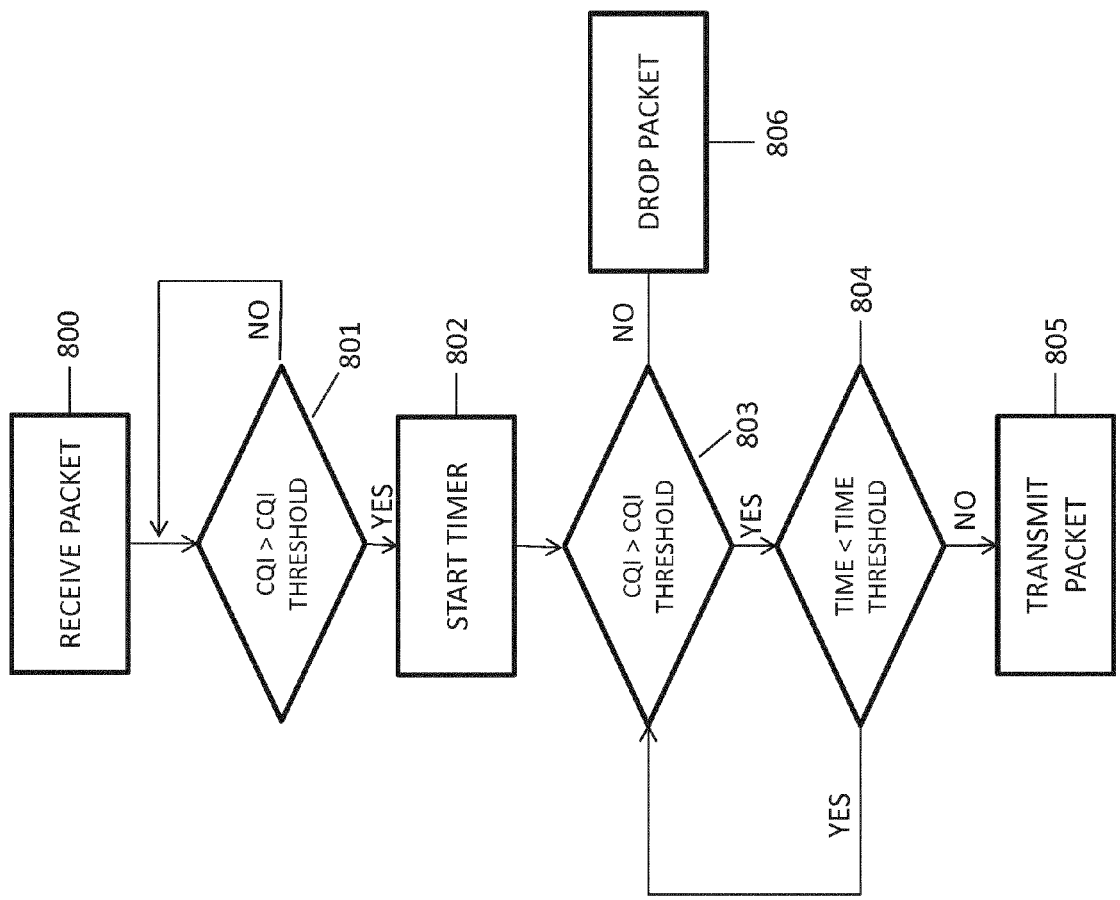
FIG. 8 shows method steps in accordance with an embodiment relating to a first time period.
Figure 9:
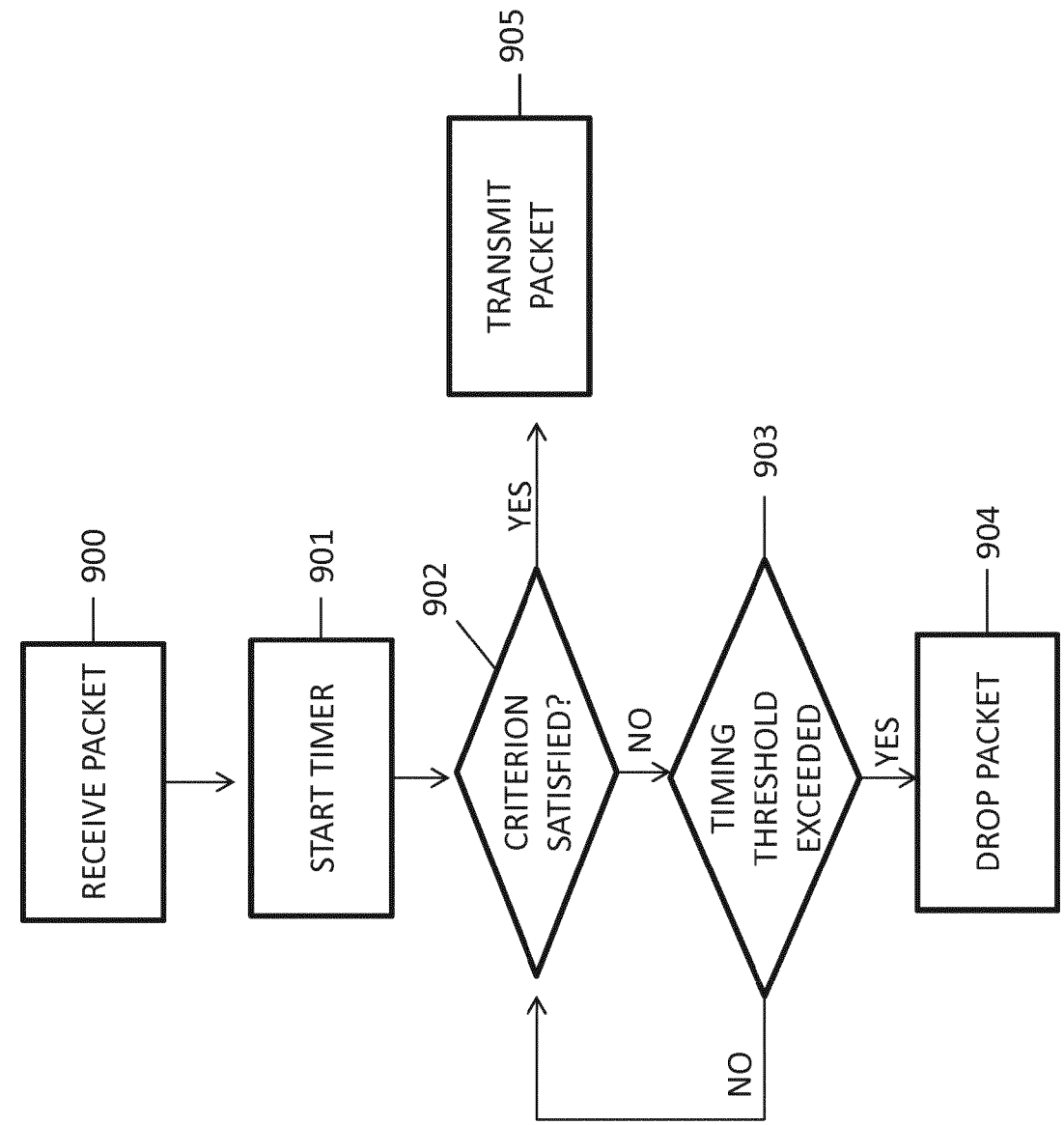
FIG. 9 shows method steps in accordance with an embodiments relating to a second time period.

Alternatively, instead of averaging or filtering these measurement, the criterion may set a threshold value and a time value. In the embodiment of FIG. 8, the criterion may set a minimum time for which the level of reliability should exceed the threshold before a packet may be transmitted. In the embodiment of FIG. 9, the timer value of the criterion sets a period of time and if the level of reliability exceed the threshold during this period, the packet is transmitted.

It will be appreciated that in some embodiments, the priority approach may be incorporated in either the embodiment of FIG. 8 or 9, with each criterion having a threshold and a timer value.

In the embodiment of FIG. 8, it is determined whether the received CQI measurements exceed a threshold set by the criterion for a minimum period of time. It will be appreciated that the minimum period may be set as part of the criterion or provided or determined separately. It will also be appreciated that the embodiment of FIG. 8 may be applicable to measurements other than or in addition to the CQI measurements.

In some embodiments the inclusion of the time period may negate the need to average, filter or otherwise process measurements from a destination device.

At step 800, a package is received at an access point.

In some embodiments, where a priority is associated with the packet, the method may include determining a criterion to use. FIG. 8 relates to an example where the criterion selected is a minimum value for CQI measurements to have, however it will be appreciated that an other criterion may be used.

The method progresses to step 801, where it is determined whether a CQI measurement received from the destination device by the access point is greater than the CQI threshold determined by the criterion. If the received CQI measurement is not greater than the threshold, the method returns to the input of step 801. If the received CQI measurement is greater than the threshold, then the method progresses to step 802 where a timer is started.

The method then progresses to step 803, where it is determined if the next received CQI measurement is greater than the threshold. If the criterion (for example, the minimum threshold) is still satisfied, the method progresses to step 804, where it is determined whether a value of the timer is less than a timing threshold.

If the value of the timer is less than the timing threshold, the method returns to step 803 where it is determined if a next CQI measurement is still greater than the CQI threshold set by the criterion.

If the value of the timer is equal to or greater than the timing threshold, in other words the received CQI measurements have exceeded the CQI threshold for the minimum required period of time, then the method progresses to step 805, where a packet or packet flow is transmitted.

If at step 803, it is determined that a received CQI measurement no longer exceed the CQI threshold, then the method progresses to step 806 and the packet is dropped. Therefore if the criterion is not satisfied for the time corresponding to the time threshold, the packet is dropped.

The time threshold may be associated with a criterion or may be a value relating to the access point. Alternatively or additionally the time threshold may be dependent on characteristics of the access point.

In other embodiments, a time threshold may be set as a maximum time period to hold a packet while waiting for the criterion to be satisfied. FIG. 9 shows an example of such an embodiment.

In the embodiment of FIG. 9, if the threshold is exceeded at any point during the time period set by the time threshold, the packet is transmitted. However if the threshold is not exceeded within the specified time period, the packet is dropped. This may allow packets to be held at an access point for the period of time set by the time threshold.

At step 900, an access point receives a packet. Similarly to FIG. 8, the embodiment of FIG. 9 may include a priority associated with the packet, in which case a criterion is selected based on the priority of the packet. The method then progresses to step 901 where a timer is started.

At step 902, it is determined whether a criterion for the packet is satisfied. If the criterion is satisfied, the method progresses to step 905 where the packet is transmitted.

If the criterion is not satisfied, the method progresses to step 903 where it is determined whether a value of the timer exceed the time threshold value.

If the value of the timer exceed the time threshold value, then it is determined that a maximum period for holding the packet has expired and the method progresses to step 904 where the packet is dropped.

If the value of the timer does not exceed the time threshold value, then the method returns to step 902, where it is determined whether the criterion has been satisfied.

In this manner, the packet may only be transmitted if the criterion for that packet is satisfied within a specified time period.

As discussed, there are many examples of a criterion that may be used. In some embodiments, the determination of which criterion to set for an access point may be for example based partly on and updated by feedback information from an access point.

As shown in relation to FIG. 3, the network node, for example the RNC, may receive feedback information from the access points in some embodiments.

In some embodiments this information may assist the radio network controller in determining the criterion. The information fed back from the access points may relate to the reliability of the connection between the access point and destination device. The reliability of the connection may be based on for example CQI measurements and/or acknowledgments made by the destination device. This information may optionally further processed by the reliability modules of the access points before being feedback to the RNC.

In some embodiments reliability measurements may be made by the destination device for neighbouring access points in communication with the destination. In some embodiments the destination device may provide reliability information relating to the neighbouring access points to an access point in addition to the reliability information relating to that access point. In these embodiments, an access point may be aware of the level of reliability of the connections between the destination device and other access points.

The information fed back to the radio network controller may include information regarding a drop or transmission rate of the packets. In some embodiments the feedback from the access point to the radio network controller may additionally or alternatively include channel state, signal quality information for example filtered CQIs, latencies and/or packet error rates.

This feedback information may be sent for example, periodically, triggered by an event and/or in response to a request.

Figure 10:
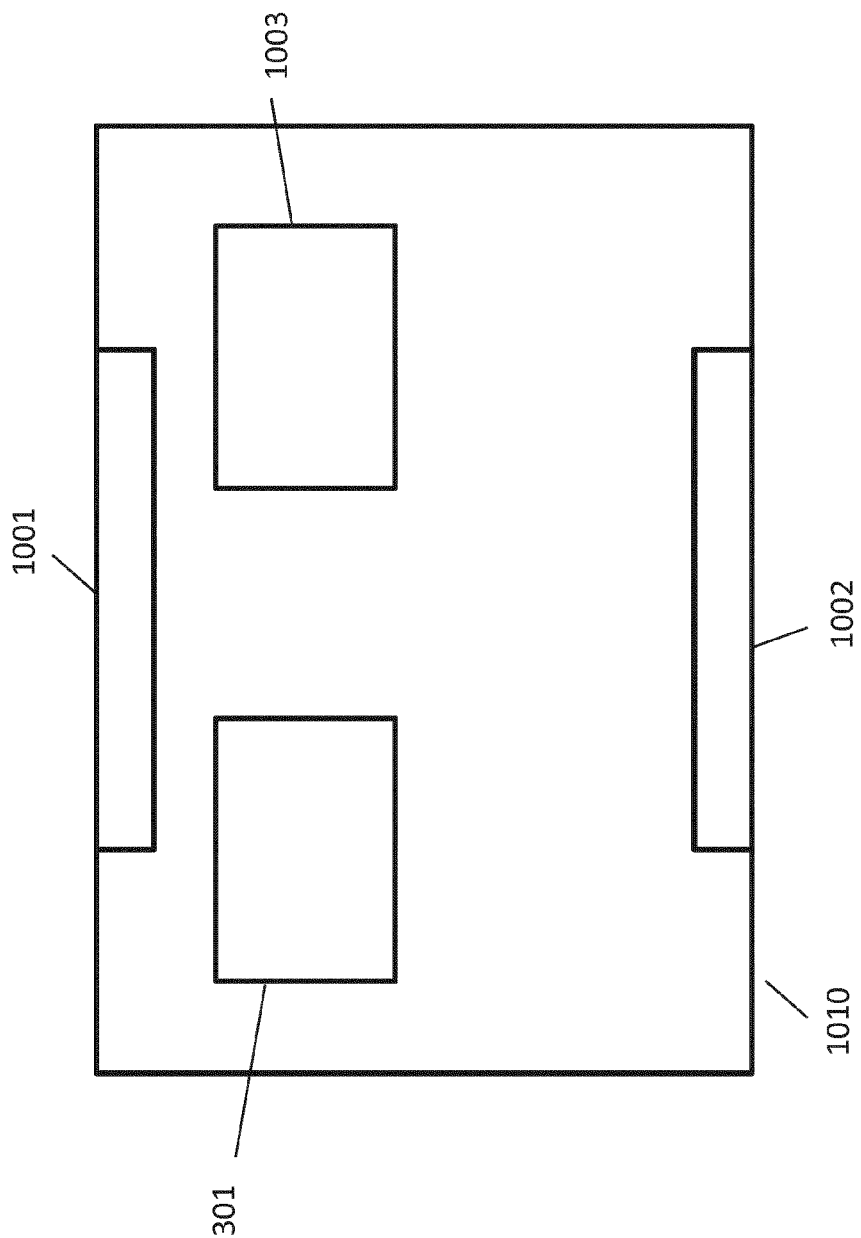
FIG. 10 shows an example of a radio network controller.

FIG. 10 shows an example of radio network controller in accordance with some embodiments. It will be appreciated that while a radio network controller (RNC) is given by example, the functionality ascribed to the RNC in some embodiments, may be carried out by another or different network entities.

The RNC 1010 of FIG. 10 includes a first interface 1001 and a second interface 1002. The first interface 1001 may be an interface suitable for communication with a core network and/or other network entities. The second interface 1002 may be an interface capable of communicating with one or more access points. It will be appreciated that in practice the RNC 1010 may comprise more than two interfaces.

The RNC 1010 includes a packet distribution module 1003. The packet distribution module 1003 may be configured to receive a packet from core network entities and process the packet appropriately. For example the packet distribution module may decode, unpack and/or otherwise determine a destination of the packet. The pack distribution module 1003 may also be configured to prepare the packets for transmission to one or more access points. It will be appreciated that the packet distribution module 1003 may operate in accordance with bicasting and unicasting.

The RNC 1010 may include a control module 301. The control module 301 may be similar to the control function 301 of FIG. 3. The control module 301 may, in some embodiments, determine a criterion for transmitting or dropping a packet to be transmitted to an access point, receive reliability information from the access point via the second interface 102 and/or carry out traditional control functions associated with an RNC 1010.

It will be appreciated that both the control module 301 and the packet distribution model 1003 may be able to receive and transmit information via the first and second interfaces 101 and 102.

It will be appreciated that the radio network controller 1010 FIG. 10 made carry out any of the method steps disclose to the foregoing. It will appreciated that embodiments are not limited to a RNC, and the functionality of the RNC may be carried out by any appropriate network entity.

Figure 11:
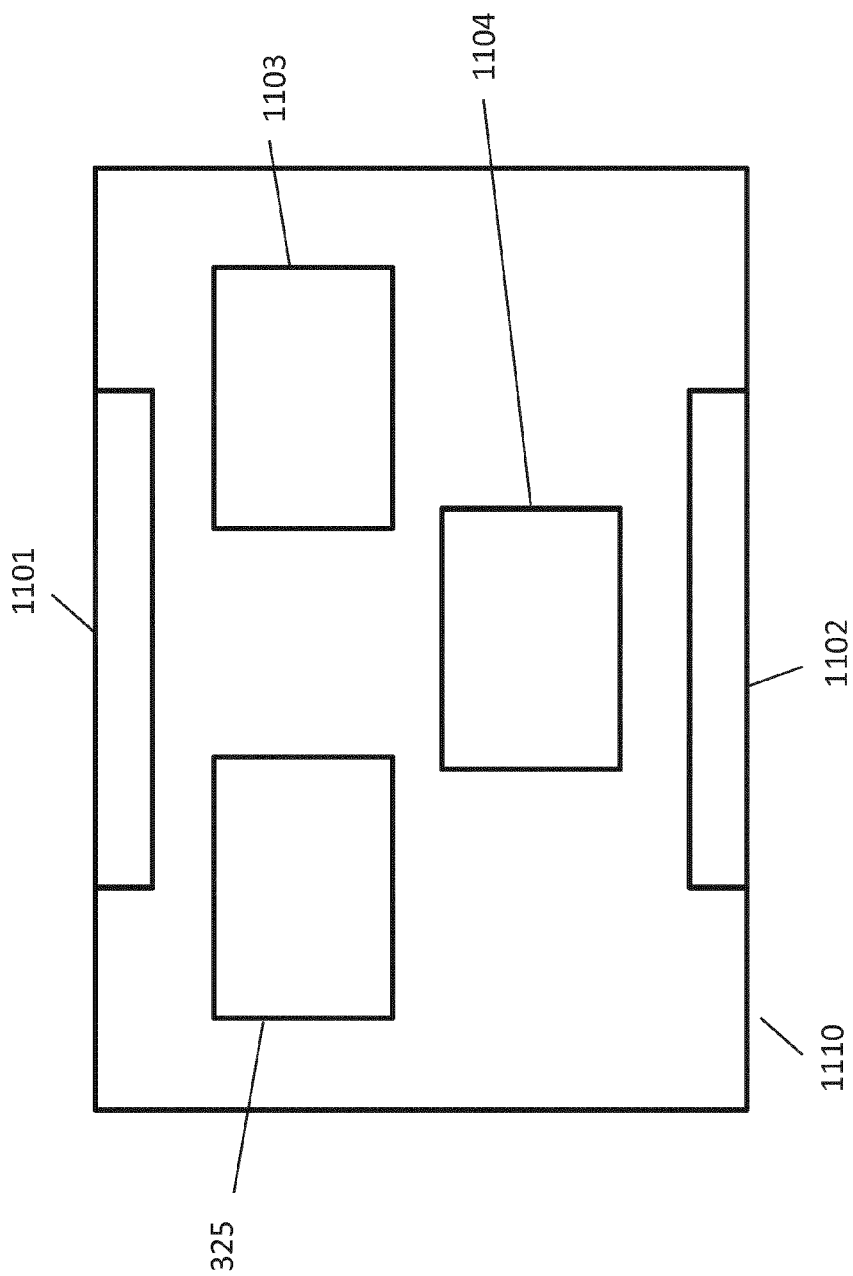
FIG. 11 shows an example of an access point.

FIG. 11 shows an example of an access point 1110 in accordance with some embodiments.

The access point 1110 may include a first interface 1101 and a second interface 1102. The first interface 1101 may be configured to communicate with a network entity such as the RNC 1010 of FIG. 10. The second interface 1102 may be configured to communicate with devices such as an user equipment or destination device.

The access point 1110 additionally may comprise a reliability module 325, a transmission control module 1103 and a packet transmission module 1104. It will be appreciated that one or more of these modules may be able to receive and transmit information via the first interface 1101 and the second interface 1102.

The transmission control module 1103 may be configured to determine whether a criterion is satisfied and whether a data packet should be transmitted or dropped. The packet transmission module 1104 may be configured to process a data packet, for example unpack, decode and/or otherwise process a packet. The packet transmission module 1104 may be configured to determine a destination of a packet. It will be appreciated that, in conjunction with the transmission control module 1103, the packet transmission module 1104 may determine to transmit a packet and transmit the packet to a destination device.

The reliability module 325 may be similar to the reliability module 325 of FIG. 3. The reliability module 325 may receive information from the destination device or user equipment and determine a reliability of a connection between the access point 1110 and the destination device.

The reliability model 325 may provide reliability information to the transmission control module 1103 and/or packet transmission module 1104. In addition, the reliability module 325 may be configured to transmit reliability information to a network entity such as the RNC of FIG. 10. This may be via the first interface 1101.

It will be appreciated that the access point 1110 of FIG. 11 may be configured to carry out any of the method steps as described in the foregoing description.

It will be appreciated that the RNC and access point of FIGS. 10 and 11 are by way of example only and may comprise additional or other functionality in some embodiments.

In embodiments, a radio network controller RNC implements the functionality associated with bicasting or unicasting. For example, the RNC may transmit bicast packets to two or more access points and unicast packets to only one access point. In the case of packets bicast from the RNC, the access points may include functionality to determine whether or not to implement bicasting. This functionality may be provided by an access point making a determination as to whether to drop or transmit a packet. The determination may be based on a criterion. The criterion may take into account a quality and/or reliability of a connection between that access point and a destination device. In some embodiments, the criterion may take into account the reliability of connections between the destination device and one or more further access points.

In the foregoing a criterion, criteria or set of criterion have been referred to. It will be appreciated that in some embodiments a criterion may include a single requirement for example a level of reliability or more than one requirement for example a level of reliability and a time threshold. A criterion may be for example a rule which should be satisfied before a packet is transmitted. The rule may for example include one or more requirements. For example, in some embodiments the rule may include a CQI requirement and a time requirement or may include a CQI requirement only. In some embodiments a set of criterion may include one or more criterions, each criterion of the set of criterions referring to one or more rules which may include one or more requirements.

In the foregoing a reliability and/or quality of a connection between an access point and destination device is discussed. In some embodiments, these connections may be in accordance with a radio access network implemented. For example, the connection may be in accordance with UMTS terrestrial radio access network (UTRAN) and/or the GSM/EDGE radio access network (GERAN).

The connection may be implemented in accordance with various methods or standards. For examples, in some embodiments, the connections may be multiflow connections in accordance with a high speed downlink packet access HSDPA and may include voice over HSDPA (CS-overHSPDA). The connections may correspond to radio bearers and in some example signalling radio bearers (SRBs).

Embodiments may be implemented in conjunction with various standards for telecommunications, for example 3G or long term evolution (LTE)/4G. In the implementation of LTE, the connections may relate to for example voice over LTE (VoLTE) connections.

In some embodiments, the connections may operate in accordance with a repeat request protocol, for example an automatic repeat request protocol (ARQ) or hybrid automatic repeat request protocol (HARQ). A destination device may issue an acknowledgement for one or more received packets and an access point may resend unsuccessfully received packets.

Some embodiments may provide channel quality indications (CQI) from the destination device. The CQIs may correspond to measurements made by the destination device relating to channel quality.

In some embodiments, CQIs and/or acknowledgements may be transmitted on an uplink channel between the destination device and access point. The CQI measurements may include measurements of channels of one or more access points.

It will be appreciated that while examples of the access points have been given as nodeB and/or base stations, the access point may be any suitable entity for communication with a destination device.

It will be appreciated that the destination device may be a user equipment, mobile station or any device capable of receiving transmissions on a telecommunications network. The destination may include but is not limited to a mobile telephone, a PDA, a tablet, laptop or other computer, a pager, modem, an automatic control unit for various hardware etc.

It is also noted herein that while the above describes exemplifying embodiments, there are several variations and modifications which may be made to the disclosed solution without departing from the scope of the present invention.

In general, the various embodiments may be implemented in hardware or special purpose circuits, software, logic or any combination thereof. Some aspects of the embodiments may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

Furthermore while some embodiments may have been described with entities associated with specific network implementation, for example in accordance with a 3G 3PP network, it will be appreciated that embodiments may be implemented in other networks and by network entities not restricted by a specific network implementation.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more of any of the other embodiments previously discussed.

The invention claimed is:

1. A method comprising:
   receiving a packet and determining whether a bicast indication associated with the packet indicates that the packet has been transmitted to two or more access points;
   comparing at least one criterion from a first of said two or more access points with a respective at least one criterion from at least a second of said two or more access points; and
   determining whether to drop said packet based at least in part on the result of said comparison.

2. The method of claim 1 further comprising:
   transmitting the packet in response to a determination that at least one criterion is satisfied.

3. The method of claim 1 wherein the at least one criterion from each of the said at least a first and at least a second of said two or more access points corresponds to a level of reliability of at least one connection between the respective access point and a user equipment.

4. The method of claim 3, further comprising:
   receiving information corresponding to a level of reliability of the at least one connection between each of said at least a first and at least a second of two or more access points and the user equipment.

5. The method of claim 4 wherein determining whether at least one criterion for a packet is satisfied further comprises determining a level of reliability of the at least one connection between each of said at least a first and at least a second access point of two or more access points and the user equipment based on the received information.

6. The method of claim 3 wherein the at least one criterion from each of said at least a first and at least a second of said two or more access points is associated with a time period.

7. The method of claim 6 wherein determining whether the at least one criterion is satisfied further comprises:
   determining whether the at least one criterion is satisfied for a duration of the time period.

8. The method of claim 6 wherein determining whether the at least one criterion is satisfied further comprises:
   determining whether the at least one criterion is satisfied at any point during the time period.

9. The method of claim 1, further comprising:
   selecting the at least one criterion from a set of criteria.

10. The method of claim 9, wherein the at least one criterion from each of said at least a first and at least a second of said two or more access points is selected based on the indication.

11. The method of claim 10 wherein the indication indicates at least one of:
    an identity of a packet flow; and
    a priority associated with the packet.

12. The method of claim 1 wherein the bicast indication corresponds to at least one of:
    a priority class of a packet flow; and
    a connection between an access point and a user equipment.

13. The method of claim 1 further comprising:
    receiving the bicast indication associated with the packet.

14. A method comprising:
    configuring at least a first criterion, for transmission to a first of two or more access points;
    configuring at least a second criterion, for transmission to at least a second of said two or more access points;

transmitting the first and second criteria to the first and a second of said two or more access points, respectively; and transmitting a packet to the two or more access points;

wherein each of the criteria is configured such that a comparison of the criteria, received by a user equipment from the respective access points, indicates whether or not the packet should be dropped based at least in part on the result of said comparison.

15. A non-transitory computer-readable medium storing a program of instructions, execution of which by at least one processor configures an apparatus to perform the method of claim 1.

16. An apparatus comprising:

receiving means for receiving a packet;

determining means for determining whether a bicast indication associated with the packet indicates that the packet has been transmitted to two or more access points;

comparing means for comparing at least one criterion from a first of said two or more access points with a respective at least one criterion from at least a second of said two or more access points; and determining means for determining whether to drop said packet based at least in part on the result of said comparison.

17. The apparatus of claim 16 wherein the apparatus is a radio network controller.

18. An apparatus comprising:

means for configuring at least a first criterion, for transmission to a first of two or more access points:

means for configuring at least a second criterion, for transmission to at least a second of said two or more access points;

transmitting means for transmitting the first and second criteria to the first and second access points, respectively, and transmitting a packet to the two or more access points;

wherein each of the criteria is configured such that a comparison of the criteria, received by a user equipment from the respective access points, indicates whether or not the packet should be dropped based at least in part on the result of said comparison.

19. An apparatus comprising:

at least one processor;

memory storing a program of instructions;

wherein the memory storing the program of instructions is configured to, with the at least one processor, cause the apparatus to perform at least:

determining whether a bicast indication associated with a received packet indicates that the packet has been transmitted to two or more access points;

comparing at least one criterion from a first of said two or more access points with a respective at least one criterion from at least a second of said two or more access points; and determining whether to drop said packet based at least in part on the result of said comparison.

* * * * *